US011501482B2

(12) United States Patent
Roland et al.

(10) Patent No.: US 11,501,482 B2
(45) Date of Patent: Nov. 15, 2022

(54) ANONYMIZATION APPARATUS, SURVEILLANCE DEVICE, METHOD, COMPUTER PROGRAM AND STORAGE MEDIUM

(71) Applicant: Robert Bosch GmbH, Stuttgart (DE)

(72) Inventors: Matthias Roland, Hildesheim (DE); Gregor Blott, Salzgitter (DE); Jan Rexilius, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/203,936

(22) Filed: Mar. 17, 2021

(65) Prior Publication Data

US 2021/0295581 A1 Sep. 23, 2021

(30) Foreign Application Priority Data

Mar. 18, 2020 (DE) ...................... 10 2020 203 473.7

(51) Int. Cl.
| | |
|---|---|
| *G06T 13/80* | (2011.01) |
| *H04N 7/18* | (2006.01) |
| *G06T 7/246* | (2017.01) |
| *G06T 13/40* | (2011.01) |
| *G06V 20/52* | (2022.01) |

(Continued)

(52) U.S. Cl.
CPC ............. *G06T 13/80* (2013.01); *G06T 7/251* (2017.01); *G06T 13/40* (2013.01); *G06V 10/22* (2022.01); *G06V 20/52* (2022.01); *G06V 20/653* (2022.01); *H04N 7/183* (2013.01);
(Continued)

(58) Field of Classification Search
None
See application file for complete search history.

(56) References Cited

U.S. PATENT DOCUMENTS

2020/0027200 A1* 1/2020 Celestini ................ G06V 10/25

FOREIGN PATENT DOCUMENTS

| DE | 102016223859 A1 | 5/2018 |
|---|---|---|
| KR | 20160012362 A | 2/2016 |

OTHER PUBLICATIONS

Cucchiara et al., "A system for automatic face obscuration for privacy purposes", Pattern Recognition Letters, 2006, vol. 27, pp. 1809-1815.

(Continued)

*Primary Examiner* — Peter Hoang
(74) *Attorney, Agent, or Firm* — Michael Best & Friedrich LLP

(57) ABSTRACT

An anonymization apparatus 6 is proposed for the generation of anonymized images 9, wherein surveillance images 5 are provided through video surveillance of a surveillance region 3 by means of at least one camera 2, with a recognition module 11, wherein the surveillance images 5 are provided to the recognition module 11, wherein the recognition module 11 is configured to recognize persons 4 contained in the surveillance images 5, with a processing module 13, wherein the processing module 13 is configured to process the surveillance images 5 into the anonymized images 9, wherein at least one person 4 or person segment included in the surveillance images 5 is anonymized in the anonymized images 9, wherein the processing module 13 is configured to replace the recognized person 4 or person segment by an animated person model 14 for the purpose of anonymization.

12 Claims, 2 Drawing Sheets

(51) Int. Cl.
    *G06V 10/22*       (2022.01)
    *G06V 20/64*       (2022.01)
    *G11B 27/031*      (2006.01)
(52) U.S. Cl.
    CPC ............... *G06T 2207/30196* (2013.01); *G06T 2207/30232* (2013.01); *G11B 27/031* (2013.01)

(56) References Cited

OTHER PUBLICATIONS

Blazevic et al., "Towards Reversible De-Identification in Video Sequences Using 3D Avatars and Steganography", CCVW, 2015, pp. 9-14.
Brkic et al.,. "Face, hairstyle and clothing colour de-identification in video sequences", IET Signal Processing, 2017, vol. 11, Issue 9, pp. 1062-1068.
Brkic et al., "I Know That Person: Generative Full Body and Face De-Identification of People in Images", IEEE Conference on Computer Vision and Pattern Recognition Workshops, 2017, pp. 1319-1328.
Meden et al., "k-Same-Net k-Anonymity with Generative Deep Neural Networks for Face De-identification", Entropy, 2018, vol. 20, No. 60, 24 pages.

\* cited by examiner

ANONYMIZATION APPARATUS, SURVEILLANCE DEVICE, METHOD, COMPUTER PROGRAM AND STORAGE MEDIUM

BACKGROUND OF THE INVENTION

The invention relates to an anonymization apparatus for the generation of anonymized images. The invention furthermore relates to a surveillance device, a method, a computer program and a storage medium.

Recordings of images and/or video are made in many areas of daily life. Such surveillance in public spaces is often viewed critically, and is subject to strict legal conditions. The protection of data related to persons shown thereon is of high significance in the field of personal rights. On the other hand, large quantities of data containing surveillance images are required in order, for example, to develop, train and/or test new algorithms and/or systems. Systems based on deep learning and/or machine learning in particular need enormous quantities of data in order to be able, for example, to train person detection systems with an adequately good performance. In order to make persons in image data unrecognizable, the corresponding areas of persons have until now been pixelated and/or made unrecognizable through black boxes. However, if such a person is made unrecognizable in this way, the data cannot be used to be able to carry out developments, tests and/or training of image processing systems.

The document DE 10 2016 223 859 A1, which does indeed represent the incoming prior art, describes a camera for monitoring a surveillance region in which an unmasked surveillance image is recorded by means of a camera sensor and the unmasked surveillance image is processed by means of an integrated evaluation unit into a masked output image, wherein the personally specific region has here been made unrecognizable.

SUMMARY OF THE INVENTION

The object of the invention is an anonymization apparatus that is configured and/or suitable for the generation of anonymized images. The anonymization apparatus serves in particular to provide anonymized images that are preferably based on non-anonymized images. The term "anonymized images" refers in particular to images that conform to the European General Data Protection Regulation. Anonymized images preferably furthermore refers to images in which a person has been anonymized, changed and/or made unidentifiable. In particular, anonymized images are images in which a person represented in the anonymized images cannot be traced back and/or restored to the original, real person. The anonymization apparatus can be configured as a software module or as a hardware module, for example as a computer chip or a computing unit.

A surveillance region can be monitored by means of a camera. The surveillance region is, for example, an interior region or an exterior region. The surveillance region is preferably a public region, for example a public authority, an airport or a railway station. The surveillance region can, in particular, be a region of a vehicle, monitored, for example, for autonomous driving. The camera is preferably arranged and/or can be arranged in the surveillance region. The surveillance takes place in particular using a video camera, for example a color, monochrome, 3D or infrared camera. The monitoring of the surveillance region with the camera is performed for the provision of surveillance images. The surveillance images show the monitored surveillance region and, in particular, persons who are located in the surveillance region. The surveillance images correspond in particular to a real and/or non-anonymized image of the surveillance region. The camera is in particular configured to generate a data stream of images, in particular a video sequence, as surveillance images.

The anonymization apparatus comprises a recognition module. The recognition module is preferably configured as a hardware component and/or a software component in the anonymization apparatus. The surveillance images are provided through data technology, for example by means of a wireless or wired connection, to the recognition module. The recognition module in particular is configured to analyze and/or to process the surveillance images. At least one person, or precisely one person, can be located or remain in the surveillance image, in particular temporarily or permanently. The recognition module is configured to detect one person, some persons and/or all persons in the surveillance image on the basis of the surveillance images. The recognition module is in particular configured to examine the surveillance images on the basis of rules, for example predefined parameters and/or characteristics, wherein the parameters are configured for finding persons and/or for distinguishing between persons and background. The recognition module is in particular configured to detect the persons by means of a model-based method.

The anonymization apparatus comprises a processing module. The processing module is preferably configured as a hardware component and/or a software component in the anonymization apparatus. The processing module is configured to process the surveillance images into the anonymized images, wherein for this purpose at least one of the recognized persons or person segments is anonymized in the anonymized images. The processing module is in particular configured to anonymize one, some or all of the persons and/or person segments of the persons. Here, a person refers to the entire body of the person, a person segment refers to one or a plurality of bodily parts and/or bodily regions such as, for example, the lower body, upper body, head, face and so forth of the person. The person and/or person segment that was recognizable in the surveillance images is shown in the anonymized images in an anonymized form. Anonymized means in particular that the person or the person segment cannot be recognized and/or identified by a non-expert or third party. The recognition module is, for example, configured to detect persons in the surveillance images and/or to determine regions in which the persons are represented, wherein the detected persons and/or person segments are then anonymized by the processing module. It can, in principle, be provided that the entire body of the person is anonymized. Alternatively, it is provided that only specified person segments are anonymized, wherein other person segments remain real and/or unprocessed.

It is proposed in the context of the invention that the processing module is configured to replace the recognized person or the recognized person segment by an animated person model in order to anonymize the recognized person or the recognized person segment. An animated person model in particular refers to an artificially generated counterpart related to the recognized person or person segment that is provided with at least one item of personal information related to the recognized person or person segment. Preferably the personal information comprises one or a plurality of visible movement features such as, for example, bodily posture, gestures, facial expression, direction of view and so on. Optionally, the personal information can comprise one or a plurality of visible personal features such as, for example, gender, age, skin color, hairstyle and so forth. Particularly preferably, the animated person model comprises one, some or all of the visible items of personal information of the recognized person. Anonymized images that are prepared by the processing module are in particular further useful as training datasets and/or in image processing, so that such devices can draw relevant data from these images. The anonymization takes place in particular by means of the processing module during ongoing operation and/or instantaneously.

The advantage of the invention is, in particular, that an anonymization apparatus is proposed in the processing module that permits an anonymization of persons in a complete video sequence, wherein the behavior of individual persons and/or interactions of groups of persons are retained. The anonymized images can thus, for example, be used for training or testing algorithms without providing personally specific data.

In a preferred embodiment it is provided that the anonymization apparatus comprises an estimation module. The estimation module is preferably configured as a hardware component and/or a software component in the anonymization apparatus. The estimation module is configured to estimate at least one or precisely one movement feature of the recognized person or person segment. The estimation module is preferably connected through data technology for this purpose to the recognition module. The estimation module in particular estimates one, some or all of the movement characteristics of the recognized persons or person segment. The estimation module can here analyze a movement of the recognized person or person segment in order to estimate the at least one movement feature. The estimation module can, for example, estimate the movement feature on the basis of a model of the body of the recognized person. The estimated movement feature can preferably be used subsequently by the processing module in order to animate the person model. The processing module can preferably animate the person model on the basis of the estimated movement feature, so that the animated person model executes the same movements in the anonymized images as the real person in the surveillance images. The person model can, for example, have the same bodily posture, gestures, facial expression and/or direction of view as the real person. Anonymized images that can be analyzed and that, at the same time, conform with data protection, can thus in this way be generated by the anonymization apparatus.

It is provided in a further concretization that the estimation module is configured to estimate at least one movement feature of the recognized person or person segment by means of pose estimation. The person or person segment is in particular detected here by the recognition module, and a pose of the person or of the person segment is then estimated by the estimation module. The pose in particular describes a position and orientation of the person or person segment recognized in the surveillance images. The estimation module can preferably determine one, some or all movement features by means of pose estimation. It is therefore an underlying consideration of the invention, to provide an anonymization apparatus that is characterized by a particularly reliable transfer of the movement from the real person to the animated person model.

In a further embodiment it is provided that a dataset with a large number of synthetic person models is provided to the processing module. The synthetic person models are, in particular, artificially generated person models that have a realistic appearance. The synthetic person models can, for example, be generated through an interaction between two neural networks or by a generic generating network, also known as generative-adversarial networks (GAN). The dataset may in particular be a purchasable and/or commercial and/or open source dataset. The processing module is configured to select a suitable synthetic person model from the dataset, in order to prepare the animated person model. The processing model can subsequently transfer the estimated movement features to the synthetic person model, so that the animated person model is generated.

It is preferable for the processing module to select the synthetic person model on the basis of the personal information of the recognized person and/or of the recognized person segment. The processing module can in particular select a synthetic person model that has the closest correspondence to the personal information, in particular personality features and/or movement features, of the recognized person or person segment from the dataset. The synthetic person model preferably comprises all the relevant features of the recognized person or of the recognized person segment. An anonymization apparatus is thus proposed that serves for the provision of anonymized images that have a particularly close correspondence to the real surveillance images.

It is provided in one concrete implementation that the processing module is configured as an AI module. The AI module is in particular configured to learn and/or to improve the selection and/or animation of the synthetic person models in the anonymized images. The AI module is preferably configured to learn relevant information, in particular the movement features, of the individual persons. Alternatively, or as an optional extension, the recognition module is configured as an AI module. The AI module is in particular configured to learn and/or to improve the detection of persons in the surveillance images. The AI module is preferably configured to detect the persons in the surveillance images and/or to select persons or groups of persons that should be anonymized on the basis of the relevant personal information, in particular of the movement features.

It is provided in a further embodiment of the invention, that the anonymization apparatus comprises an input interface that is configured and/or suitable to accept the surveillance images. The input interface serves in particular for connecting the camera through data technology. The anonymization apparatus also comprises an output interface that is configured and/or suitable for the provision of the anonymized images. The output interface serves in particular for the provision of the anonymized images as training data, wherein an image algorithm can be tested, improved and/or trained by means of these provided training data. The input interface and/or the output interface can be configured as a wired interface or as a radio interface such as, for example, a WLAN interface, infrared interface or Bluetooth interface.

In a further concretization it is provided that the anonymization apparatus comprises a memory module that is configured and/or suitable for storing the anonymized images. The memory module can, for example, form a central memory module in the anonymization apparatus. The stored images are, in particular, anonymized and do not infringe data protection law.

A further object of the invention is that of a surveillance device with at least one camera for video surveillance of the surveillance region. The surveillance device in particular can comprise a plurality of cameras, wherein the anonymization apparatus is connected through data technology to, for example, a plurality of cameras, so that the surveillance images of the plurality of cameras are made available to the anonymization apparatus. The anonymization apparatus is preferably integrated, or can be integrated, into one of the cameras and/or the surveillance device. The anonymization apparatus can, alternatively, however also be connected externally to the at least one camera, in particular by way of the input interface. The anonymization and/or the generation of the anonymized images can in particular take place during ongoing operation, on-the-fly and/or instantaneously during an image recording and/or surveillance by the anonymization apparatus.

A method for the generation of anonymized images is a further object of the invention. It is provided here that surveillance images are converted into anonymized images. The surveillance images can, for example, be recorded by means of a camera. The surveillance images are subsequently converted into anonymized images in such a way that persons, or person segments, that are shown in the surveillance images and/or are included in them, are made unrecognizable and/or anonymized in the anonymized images. The anonymization takes place here in two steps, wherein the persons are recognized in the surveillance images in a first step, and the recognized person, or at least a person segment of the recognized person, is replaced or overlaid by an animated person model in a second step.

It is particularly preferred that the animated person model is prepared on the basis of an estimated movement feature of the recognized person or of the person segment. Preferably the at least one person in the surveillance images is analyzed in order to identify one or a plurality of movement features of the person or of the person segment. The movement feature can, for example, be ascertained by means of a method of pose estimation. The movement features of the real person are then transferred to a synthetic person model, so that the synthetic person model has the same movement features as the real person. The animated person model generated in this way is transferred into the surveillance images by overlaying or replacing the recognized person or person segment, and said images are made available as the anonymized images.

The method is preferably designed to select the synthetic person model from a plurality of synthetic person models. A suitable person model is, in particular, selected on the basis of known personal information of the real person, or of a person segment of this person, from the plurality of synthetic person models. The plurality of synthetic person models can, for example, be generated in advance and/or stored in a database. The synthetic person models can, alternatively, be generated simultaneously in the context of the anonymization process on the basis of the personal information.

In a further implementation, it is provided that the method is designed to generate and/or to store the anonymized images as training data for training an image processing algorithm. The method serves, for example, to convert a plurality of surveillance images into a plurality of training data, wherein the training data comprise the anonymized images. The training data here are in particular configured such that the persons are anonymized but nevertheless have such features, in particular the movement features of the real person, as are to be evaluated and/or are needed by an image processing algorithm. The generated training data and/or anonymized images can, for example, be provided to a machine learning algorithm for an image evaluation software and/or to an image algorithm.

A further object of the invention is formed by a computer program, wherein the computer program is configured to carry out the method for the generation of the anonymized images when the computer program is executed on a computer, a processing unit or the anonymization apparatus.

A further object of the invention is formed by a storage medium wherein the storage medium comprises the computer program as previously described.

BRIEF DESCRIPTION OF THE DRAWINGS

Further advantages, effects and embodiments emerge from the appended figures and their description. Here.

DETAILED DESCRIPTION

Figure 1:
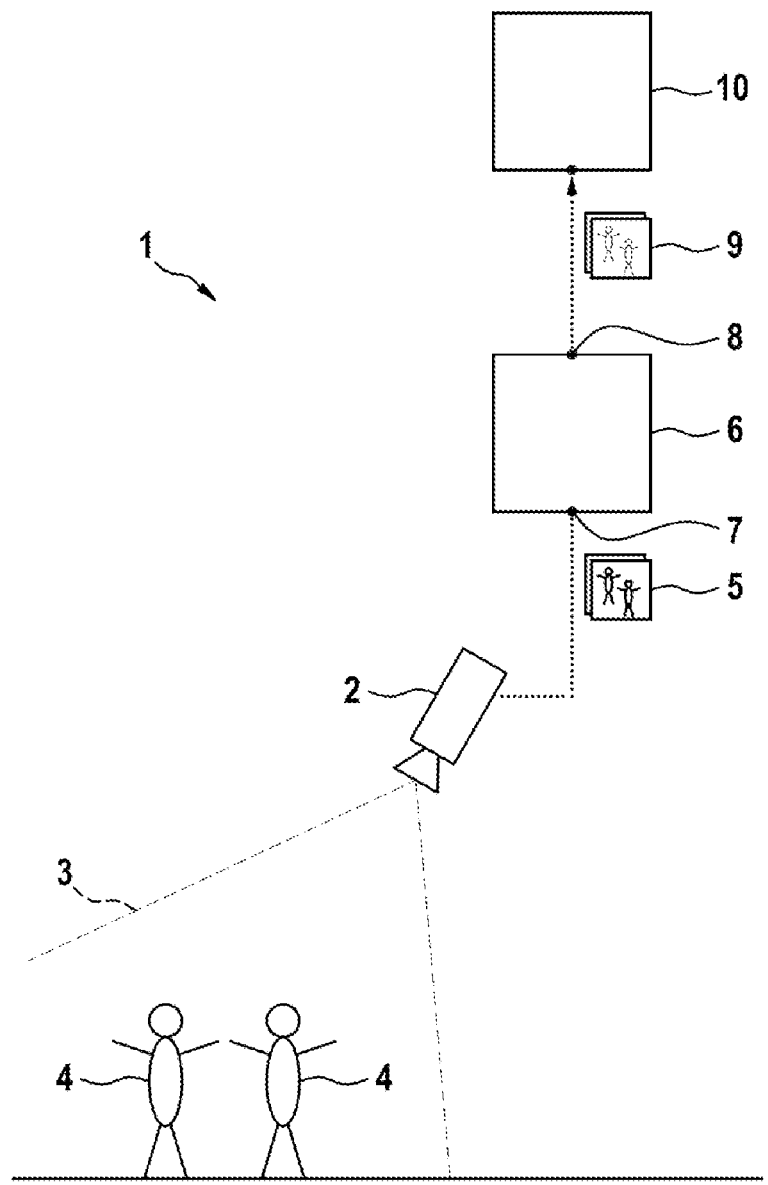
FIG. 1 shows a schematic illustration of a surveillance device with an anonymization apparatus as one exemplary embodiment of the invention.

FIG. 1 shows a schematic illustration of a surveillance device 1. The surveillance device 1 comprises a camera 2 that is configured to monitor a surveillance region 3 through video technology. The camera 2 is, for example, configured as a video camera, preferably as a color camera. The surveillance region 3 is, for example, a road, wherein the camera 2 can, for example, be installed in a vehicle, not illustrated.

Persons 4 are located in the surveillance region 3, and can move freely therein. The persons 4 are also monitored using video technology by means of the camera 2. The camera 2 here represents the surveillance region 3 in the form of surveillance images 5, wherein the camera 2 makes the surveillance images 5 available as video sequences.

A large amount of data from real sequences is required for the development and the test of new algorithms, for example for autonomous driving. In particular, to achieve adequate performance, methods from the field of deep learning, in which large networks with many thousand parameters are trained, need enormous quantities of data. Not only individual images, but also video sequences with the persons 4 are necessary, wherein the personally specific data of the persons 4 must be protected in the context of the General Data Protection Regulation (GDPR). It is possible, for example, for this purpose to apply a simple pixelation or other way of making the data unrecognizable, for example through a black box over the persons 4 or over the face of the persons 4, but this type of anonymization method however makes the data unusable either for the testing or for the training of algorithms.

An anonymization of the surveillance images 5 that enables a further use for the development of algorithms that conforms with data protection is therefore proposed. For this purpose, the camera 2 is connected through data technology to an anonymization apparatus 6. The anonymization apparatus 6 has an input interface 7 for this purpose, wherein the camera 2 provides the surveillance images 5 to the input interface 7 of the anonymization apparatus 6. The surveillance images 5 that are provided show the persons 4, in particular in a non-anonymized form and/or as a real, recognizable image. The camera 2 can, for example, be connected to the anonymization apparatus 6 by means of a wireless or wired connection. The anonymization apparatus 6 can alternatively also be integrated into the camera 2.

The anonymization apparatus 6 is configured to convert the surveillance images 5 into anonymized images 9. The anonymized images 9 comprise the persons 4 shown in the surveillance images 5 in anonymized form. The anonymization represents a data protection measure, so that the anonymized images 9 do not have any personally specific data by means of which the original person could be identified.

The anonymization apparatus 6 comprises an output interface 8, for example a wireless interface or a wired interface, by means of which the anonymized images 9 can be provided to an external unit 10 or, alternatively, also immediately to a person. Only the anonymized images 9 are provided here to the output interface 8, so that access to or the output of non-anonymized personal information is prevented. The external unit 10 can, for example, be a computing unit or a data collection center that needs images in order to train image processing algorithms. No personally specific information is typically required for the training of such image processing algorithms, so that the algorithm can also be trained using anonymized images 9.

Figure 2:
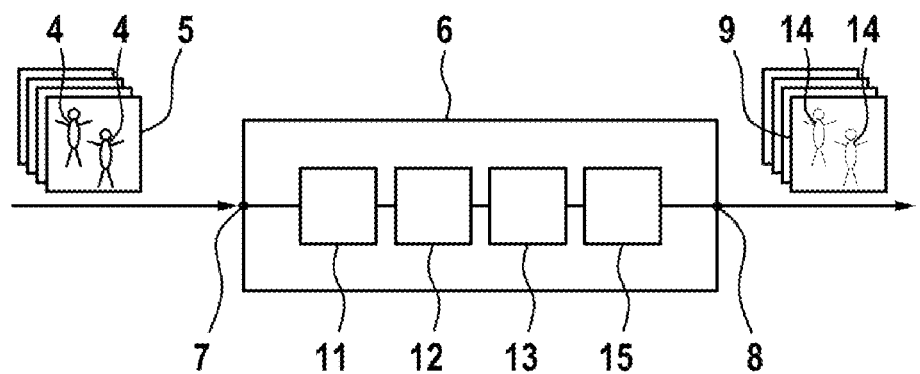
FIG. 2 shows a schematic illustration of the anonymization apparatus from FIG. 1.

FIG. 2 shows a schematic illustration of the anonymization apparatus 6 as an exemplary embodiment of the invention. The anonymization apparatus 6 is, for example, configured as a processor, microchip or as a software module.

The anonymization apparatus 6 comprises a recognition module 11, wherein the surveillance images 5 are provided via the input interface 7 to the recognition module 11. The recognition module can, for example, be configured as an electronic component, and connected through data technology, for example by way of a wired cable, to the input interface 7. The recognition module 11 has the function of checking the surveillance images 5 for persons 4, and of recognizing the found persons 4 as such. The recognition module 11 can, for example, analyze the surveillance images 5 for particular characteristics, and assess whether something is a person 10 or an object on the basis of a body of rules. For example, the recognition module 11 marks the recognized persons 10 in the surveillance images 5.

The anonymization apparatus 6 comprises an estimation module 12, wherein the surveillance images 5 with the recognized persons 4 are provided to the estimation module 12. The estimation module 12 is, for example, configured as a further electronic component, that is connected through data technology to the recognition module 11. The estimation module 12 is configured to estimate one or a plurality of movement features as personal information of the recognized persons 4, in order to recognize behavior and/or movements of the persons 4 in the surveillance images 5. This can, for example, occur through the evaluation of at least two surveillance images 5 of an overlapping and/or identical partial region recorded at different times. The at least one movement feature can, for example, be ascertained through a known method of pose estimation, for example that of pictorial structures.

The anonymization apparatus 6 further comprises a processing module 13, wherein the surveillance images 5, with the recognized persons 4 and the associated movement features, are provided to the processing module 13. The processing module 13 is, for example, configured as a further electronic component, that is connected through data technology to the estimation module 12. The processing module 13 is configured to replace the recognized persons 4 or person segments in the surveillance images 5 by animated person models 14. On the basis of the movement features, further personal information such as, for example, gender, skin color, clothing and so forth, and/or other relevant criteria, the processing module 13 selects for this purpose a suitable synthetic person model from a dataset with a plurality of synthetic person models. The synthetic person models 14 here are realistic models of persons that are generated artificially, so that personally specific data, and/or data that is relevant to data protection law, is eliminated in the person models 14.

The processing module 13 is configured to animate the synthetic person models on the basis of the movement features, so that the synthetic person models 14 perform the same movements as the real persons 4 in the surveillance images. The animated person model 14 can, for example, have the same bodily posture, direction of view, gestures and/or facial expression as the real person. To generate the anonymized images 9, the persons 4, or person segments, are replaced or overlaid by the animated person models 14, so that the real persons 4 or person segments can no longer be seen in the anonymized images 9.

The anonymization apparatus 6 can optionally comprise a memory module 15, in which the anonymized images 9 can be stored in the memory module 15. The processing module 13 can here optionally provide the anonymized images 9 immediately to the output interface 8, or can store them in the memory module 15, for example for later use.

Thus, through the anonymization apparatus 6, an anonymization of persons 4 can be implemented in a total video sequence in a simple manner, wherein the behavior of individual persons 4 and interactions of groups are retained in spite of the anonymization, and used for the training and testing of algorithms.

One or a plurality of cameras are installed in vehicles, and can, for example, be employed for the recognition of traffic signs. The installed cameras are particularly important for autonomously driving vehicles, and play a crucial role in the recognition of persons 4 and their behavior. In one possible embodiment, the anonymization device 6 can be installed in the vehicle in order to anonymize the recorded video sequences from the vehicle. The recorded surveillance images 5 can here, for example, be anonymized immediately during the recording, and used for a later training of deep-learning networks.

In an alternative embodiment, the anonymization apparatus 6 can also, however, be employed to subsequently anonymize an already existing data stock of recorded surveillance images 5. It is in this way made possible for these recordings to correspond to the guidelines of data protection law, and they can also be used in the future.

Figure 3:
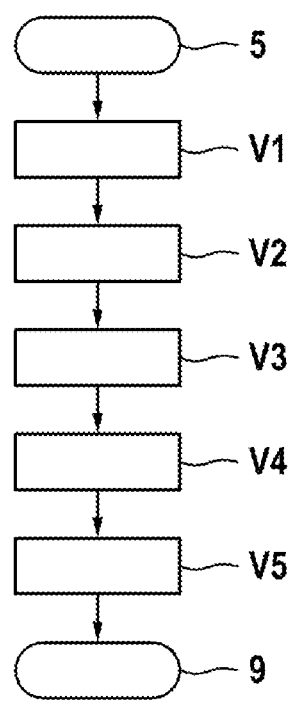
FIG. 3 shows a method for the generation of anonymized images on the basis of a flow diagram.

FIG. 3 shows, on the basis of a flow diagram, a method for the generation of the anonymized images 9, wherein the surveillance images 5 are converted into the anonymized images 9. In a first step V1, all persons 4 in the surveillance images 5 are recognized. Persons 4 or person segments that should be anonymized can be selected here for example. In a second step V2, both behaviors and movements of the recognized and/or selected persons 4 or person segments are recognized or estimated, for example on the basis of current methods for pose estimation. A selection of suitable person models from a database is made in a third step V3. Here, for example, it is possible for all the female persons 4 to be exchanged for male synthetic person models 14, and all the male persons 4 exchanged for female synthetic person models 14. In a fourth step V4 a transformation of the recognized movements onto the person models 14 takes place, so that the synthetic person models 15 perform the same movements as the real persons 4. In a fifth step V5 the persons 4 in the surveillance images 5 are overlaid by the animated person models 14, and can thus no longer be seen. The anonymized images 9 can subsequently be stored or can be provided as a live display.

The invention claimed is:

1. An anonymization apparatus for the generation of anonymized images, wherein surveillance images are provided through video monitoring of a surveillance region by at least one camera, the anonymization apparatus comprising:
   a recognition module, is configured to
   receive the surveillance images, and
   recognize at least one persons or person segment included in the surveillance images; and
   an electronic processor configured to
      receive a dataset with a plurality of artificially generated synthetic person models,
      process the surveillance images into the anonymized images, wherein at least one person or person segment included in the surveillance images is anonymized in the anonymized images,
      select a synthetic person model from the dataset for the generation of an animated person model,
      replace the recognized person or person segment for anonymization with the animated person model, and
      generate the anonymized image.

2. The anonymization apparatus according to claim 1, further comprising an estimation module, wherein the estimation module is configured to estimate a movement feature of the recognized person, wherein the electronic processor is configured to animate the person model on the basis of the estimated movement feature.

3. The anonymization apparatus according to claim 2, wherein the estimation module is configured to estimate the movement feature by means of pose estimation.

4. The anonymization apparatus according to claim 1, wherein the electronic processor is configured to select the synthetic person model from the dataset based on personal information of the recognized person, the recognized person segment, or both.

5. The anonymization apparatus according to claim 1, wherein at least the electronic processor is configured as an AI module.

6. The anonymization apparatus according to claim 1, wherein the anonymization apparatus comprises an input interface for receiving the surveillance images and an output interface for providing the anonymized images.

7. The anonymization apparatus according to claim 1, further comprising a memory module for storing the anonymized images.

8. A surveillance device comprising:
   at least one camera for video surveillance of a surveillance region, wherein surveillance images are output by the camera,
   an anonymization apparatus connected in data communication with the camera, wherein the anonymization apparatus includes a recognition module and an electronic processor, wherein
   the recognition module is configured to
      receive the surveillance images, and
      recognize at least one persons or person segment included in the surveillance images, and
   the electronic processor is configured to
      receive a dataset with a plurality of artificially generated synthetic person models,
      process the surveillance images into anonymized images, wherein the at least one person or person segment included in the surveillance images is anonymized in the anonymized images,
      select a synthetic person model from the dataset for the generation of an animated person model,
      replace the recognized person or person segment with the animated person model for the purpose of anonymization, and
      generate the anonymized image.

9. A method for generating anonymized images the method comprising:
   receiving, with a recognition module, wherein surveillance images output by a camera;
   recognizing, with the recognition module, at least one person or person segment included in the surveillance images;
   receiving, with an electronic processor, a dataset with a plurality of artificially generated synthetic person models;
   processing, with the electronic processor, the surveillance images into anonymized images, wherein the at least one person or person segment included in the surveillance images is anonymized in the anonymized images;
   selecting, with the electronic processor, a synthetic person model from the dataset for the generation of an animated person model;
   replacing, with the electronic processor, the recognized person or person segment with the animated person model, and
   generating, with the electronic processor, the anonymized image.

10. The method according to claim 9, wherein the animated person model is prepared on the basis of an estimated movement feature of the recognized person.

11. The method according to claim 9, wherein the anonymized images are generated, and/or stored, or both as training data for training an image processing algorithm.

12. A non-transitory, computer-readable storage medium containing instructions that when executed by the computer cause the computer to control an anonymization apparatus to
   generate of anonymized images, wherein surveillance images are provided through video monitoring of a surveillance region by at least one camera,
   recognize at least one person or person segment included in the surveillance images,
   receive a dataset with a plurality of artificially generated synthetic person models,
   process the surveillance images into anonymized images, wherein the at least one person or person segment included in the surveillance images is anonymized in the anonymized images,
   select a synthetic person model from the dataset for generation of an animated person model,
   replace the at least one recognized person or person segment of the recognized person with the animated person model, and
   generate the anonymized image.

* * * * *